(12) United States Patent
Hill et al.

(10) Patent No.: US 12,139,348 B2
(45) Date of Patent: Nov. 12, 2024

(54) DIRECT TRANSFER LOADING APPARATUS FOR TUBULAR FOOD ARTICLES AND METHOD OF OPERATION

(71) Applicant: F.R. Drake Company, Waynesboro, VA (US)

(72) Inventors: William C. Hill, Fishersville, VA (US); Joseph Posge, Cincinnati, OH (US)

(73) Assignee: F.R. Drake Company, Waynesboro, VA (US)

(*) Notice: Subject to any disclaimer, the term of this patent is extended or adjusted under 35 U.S.C. 154(b) by 146 days.

(21) Appl. No.: 17/839,870

(22) Filed: Jun. 14, 2022

(65) Prior Publication Data

US 2022/0396435 A1 Dec. 15, 2022

Related U.S. Application Data

(60) Provisional application No. 63/210,100, filed on Jun. 14, 2021.

(51) Int. Cl.
*B65G 47/57* (2006.01)
*B65G 15/44* (2006.01)
*B65G 17/08* (2006.01)
*B65G 23/28* (2006.01)
*B65G 47/68* (2006.01)

(52) U.S. Cl.
CPC ............. *B65G 47/57* (2013.01); *B65G 15/44* (2013.01); *B65G 17/08* (2013.01); *B65G 23/28* (2013.01); *B65G 47/681* (2013.01); *B65G 2201/0202* (2013.01)

(58) Field of Classification Search
CPC ........ B65G 15/44; B65G 17/08; B65G 23/28; B65G 47/57; B65G 47/681; B65G 2201/0202
USPC .................... 198/418.6, 431, 531
See application file for complete search history.

(56) References Cited

U.S. PATENT DOCUMENTS 4,733,518 A 3/1988 Griesdorn
5,365,717 A 11/1994 McKinlay
(Continued)

FOREIGN PATENT DOCUMENTS

EP 2404830 A1 1/2012
WO WO 2019/223945 A1 11/2019

OTHER PUBLICATIONS

US 2013/0105035 A1, Henriques et al., May 2, 2013.*
(Continued)

*Primary Examiner* — Douglas A Hess
(74) *Attorney, Agent, or Firm* — Crowell & Moring LLP

(57) ABSTRACT

A loading apparatus for use with tubular food articles. The loading apparatus comprises an input conveyor configured to convey the tubular food articles, an indexing conveyor positioned beneath the input conveyor and configured to operate in an intermittent motion, and a curved end member positioned in spaced arrangement to the input conveyor to permit the tubular food articles to pass between the input conveyor and the curved end member such that the curved end member retains the tubular food articles on the input conveyor. The input conveyor is configured to transfer the tubular food articles from the input conveyor directly to the indexing conveyor using gravity from a space between the input conveyor and the curved end member.

20 Claims, 8 Drawing Sheets

(56) References Cited

U.S. PATENT DOCUMENTS

| | | | | |
|---|---|---|---|---|
| 5,388,385 A * | 2/1995 | Phelps | ............ | B65B 19/34 |
| | | | | 53/247 |
| 5,720,149 A * | 2/1998 | Stimpfl | ............ | B65B 19/34 |
| | | | | 53/244 |
| 6,141,943 A * | 11/2000 | Hart | ............ | B65B 5/106 |
| | | | | 198/418.6 |
| 7,581,634 B2 * | 9/2009 | Hart | ............ | B65G 47/5127 |
| | | | | 198/429 |
| 8,434,310 B2 * | 5/2013 | Baxter | ............ | H01F 7/145 |
| | | | | 251/129.09 |
| 8,448,775 B2 * | 5/2013 | Feigel | ............ | B65G 47/846 |
| | | | | 198/418.6 |
| 8,453,822 B2 * | 6/2013 | Hart | ............ | B65G 47/52 |
| | | | | 198/429 |
| 9,321,599 B2 * | 4/2016 | Luz | ............ | B65G 47/5122 |

OTHER PUBLICATIONS

International search report and written opinion in International application No. PCT/US2022/033394, dated Oct. 19, 2022, 13 pages.

* cited by examiner

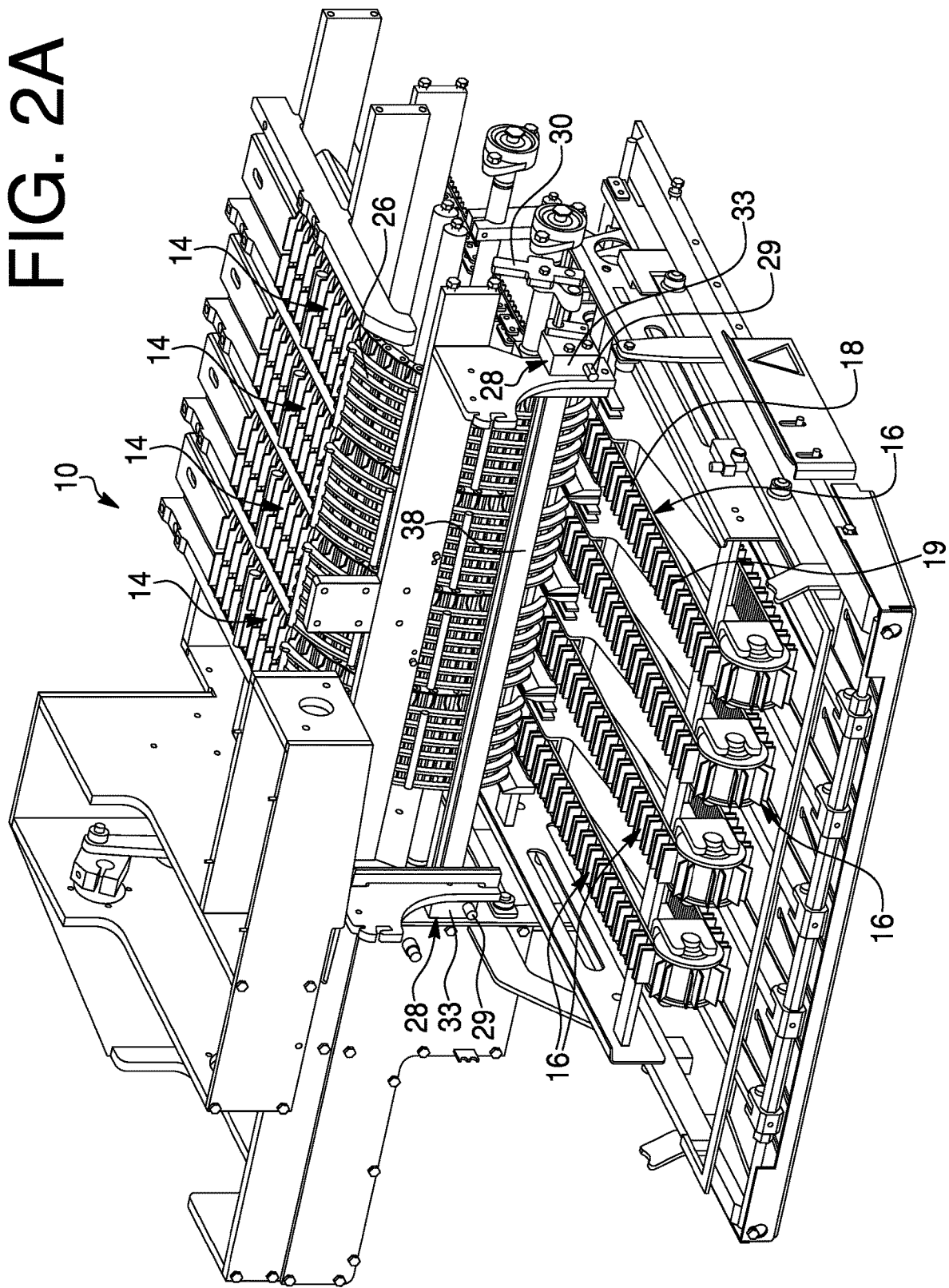

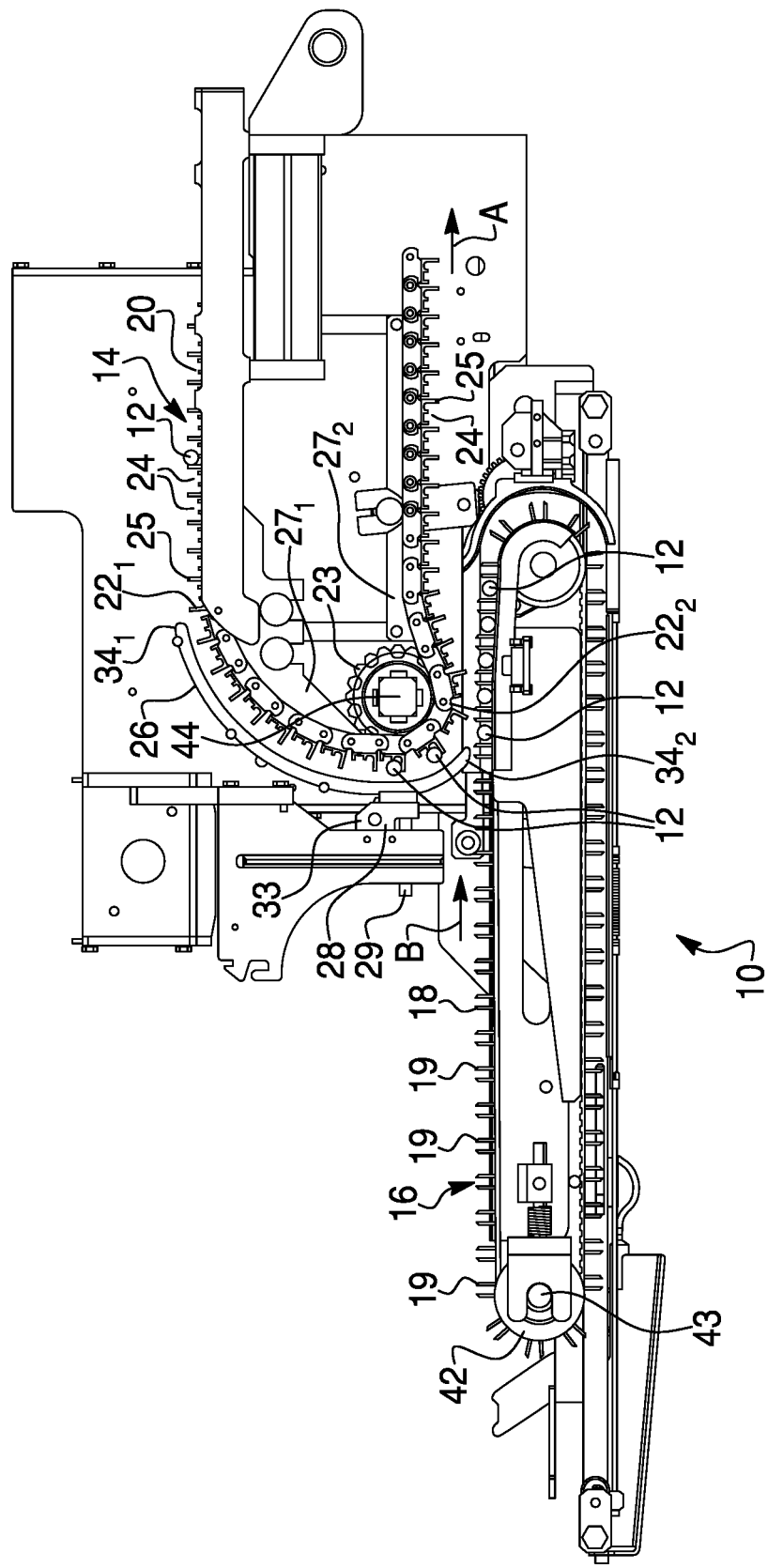

DIRECT TRANSFER LOADING APPARATUS FOR TUBULAR FOOD ARTICLES AND METHOD OF OPERATION

CROSS-REFERENCE TO RELATED APPLICATION AND CLAIM TO PRIORITY

This Application claims the benefit of U.S. Provisional Patent Application Ser. No. 63/210,100 filed Jun. 14, 2021 by Hill et al., which is hereby incorporated herein by reference in its entirety and to which priority is claimed.

BACKGROUND OF THE INVENTION

1. Field of the Invention

The present invention relates to loading apparatuses for tubular food articles, such as sausages, frankfurters (or hotdogs), breadsticks or cheese sticks, and, more particularly, to a loading head including an input conveyor configured to transfer the tubular food articles from the input conveyor directly to an indexing conveyor allowing the transferred food products to be placed into packaging. The invention also is directed to methods of operating and using the loading head so that the food products are ready for being placed into packaging. The invention is particularly useful for preparing individual food products prior to packaging.

2. Description of the Related Art

Automatic loaders for tubular food articles, such as hot dogs, sausages, cheese sticks and breadsticks, are used to organize and collate the food articles into orderly rows, so that they can be grouped and placed into the pockets of a packaging machine. The grouping and placing of food articles, such as hotdogs, into packager pockets is an essential part of the automation of a food product, such as hotdog, production line. The use of automated machinery reduces the need for workers and thus decreases costs, and also increases the overall speed of a production line to further reduce costs.

The mechanism (or loading head) for grouping and placing food articles, such as hotdogs, is typically complex, and an undesirable side-effect of the complexity is difficulty in maintaining the cleanliness and cleanability of the mechanism. An example of a loading apparatus 100 for use with tubular food articles, such as taught by U.S. Pat. No. 8,453,822, the disclosure of which is incorporated herein by reference, is shown in FIG. 1. Loading apparatus 100 comprises a main (or input) conveyor 140 configured to convey a plurality of tubular food products, an indexing conveyor 160 configured to operate in an intermittent motion, and a transfer mechanism 180 configured to transfer the food products from the main conveyor 140 to the indexing conveyor 160. FIG. 1 depicts that the food products flow through a pair of star wheels 122 and 124 of the transfer mechanism 180 to get to a grouping mechanism 190 of the indexing conveyor 160. The grouping mechanism 190 includes a chain belt 150 with a series of grouping lugs 152 equally spaced on the chain belt 150.

U.S. Pat. No. 8,453,822 uses electronic controls so that fingers of the star wheels 122 and 124 will line up with the lugs 152 of the grouping mechanism 190 as the food products are transferred from the star wheels 122 and 124 to the chain belt 150. Thus, a certain count of star wheel fingers coincides with the number of food products that will be placed in-between lugs 152 on the chain belt 150.

Typically, the loading apparatus loads a group of 4 to 6 hot dogs per layer for a retail package with the star wheels, and 10 to 12 hot dogs per layer for a bulk package. The grouping lugs 152 are equally spaced on the chain belt 150 to fit the appropriate number of hot dogs being loaded per layer.

The fingers on the star wheels move slightly faster than the chain belt 150 below assists in packing the hot dogs into a snug group. However, when the loading apparatus 100 is used for single packaged string cheese sticks or hot dogs, then the star wheels of the transfer mechanism become troublesome, particularly when loading cheese sticks because sometimes string cheese (or hot dog) is not cut properly and with the result is a foot or two long "snake" of string cheese that gets jammed up in the star wheels.

While existing loading apparatuses have proven to be acceptable for various food product launching and loading applications when loading groups of food products, improvements that may enhance their performance and ease of use, and reduce cost, when assembling individual food products for packaging, particularly cheese sticks. Therefore, the need exists for loading apparatuses for preparing single packaged tubular food products for packaging, and for simplification of the existing loading apparatuses.

Simplification of the loading apparatus will improve the cleanability, due to the fact that there are fewer parts to be cleaned and hinder or block the cleaning jets used in food product packaging plants. Another benefit of a simplified loading head is that it reduces the amount of movement and manipulation required to properly group and place hotdogs and cheese sticks. By manipulating the hotdogs and cheese sticks less, there are fewer chances that the food products will become damaged. As a result, the overall yield of the production line is improved.

BRIEF SUMMARY OF THE INVENTION

According to a first aspect of the invention, a loading apparatus for tubular food articles comprises a driven input conveyor configured to convey tubular food articles, an indexing conveyor configured to operate in an intermittent motion, and a curved end member. The input conveyor has an input end at a first elevation and a curvilinear discharge end at a second elevation, such that the second elevation is below the first elevation. The indexing conveyor is positioned below the input conveyor and is operably associated with the discharge end. The curved end member is proximate the discharge end. Moreover, the curved end member is spaced relative to the input conveyor and has a first end at the first elevation and a second end at the second elevation and configured so that tubular food articles are transported and retained by the input conveyor while being transported to the discharge end. The input conveyor is configured to transfer the tubular food articles about the input conveyor directly onto the indexing conveyor using gravity from a space between the discharge end and the indexing conveyor.

According to a second aspect of the invention, a loading apparatus for tubular food articles comprises a driven input conveyor configured to convey tubular food articles, an indexing conveyor configured to operate in an intermittent motion, and a curved endmember. The input conveyor has an input end at a first elevation and a discharge end at a second elevation, wherein the second elevation is below the first elevation. The indexing conveyor is positioned below the input conveyor and operably associated with the discharge end. The curved end member is proximate the discharge end.

The curved end member comprises a plurality of spaced parallel plates spaced relative to the input conveyor and each of the plates has a first end at the first elevation and a second end at the second elevation and the plates are configured so that tubular food articles are transported and retained by the input conveyor while being transported to the discharge end. The input conveyor is configured to transfer the tubular food articles about the input conveyor directly onto the indexing conveyor using gravity from a space between the discharge end and the indexing conveyor.

According to a third aspect of the present invention, a method of loading tubular food articles comprises the steps of conveying a plurality of tubular food articles with an input conveyor, positioning an indexing conveyor below the input conveyor and operating the indexing conveyor at speeds above and below a speed that is synchronous with a speed of the input conveyor, wherein operation of the indexing conveyor causes the indexing conveyor to travel in an intermittent motion, and adjusting the position of a curved end member relative to the input conveyor so that tubular food articles carried by the input conveyor are transferred from the input conveyor directly to the indexing conveyor using gravity from a space between the input conveyor and the curved end member. The input conveyor has an input end at a first elevation and a discharge end at a second elevation, wherein the first elevation is above the second elevation.

These and other objects of the invention, including apparatus, devices, systems, processes, and the like which constitute part of the invention, will become more apparent to one of ordinary skill in the art upon reading the following detailed description of the exemplary embodiment(s) and drawings.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 2A is a perspective view of a loading apparatus for tubular food articles in accordance with an exemplary embodiment of the present invention;

FIG. 3 is a side view of the loading apparatus for tubular food articles in accordance with the exemplary embodiment of the present invention;

Figure 1:
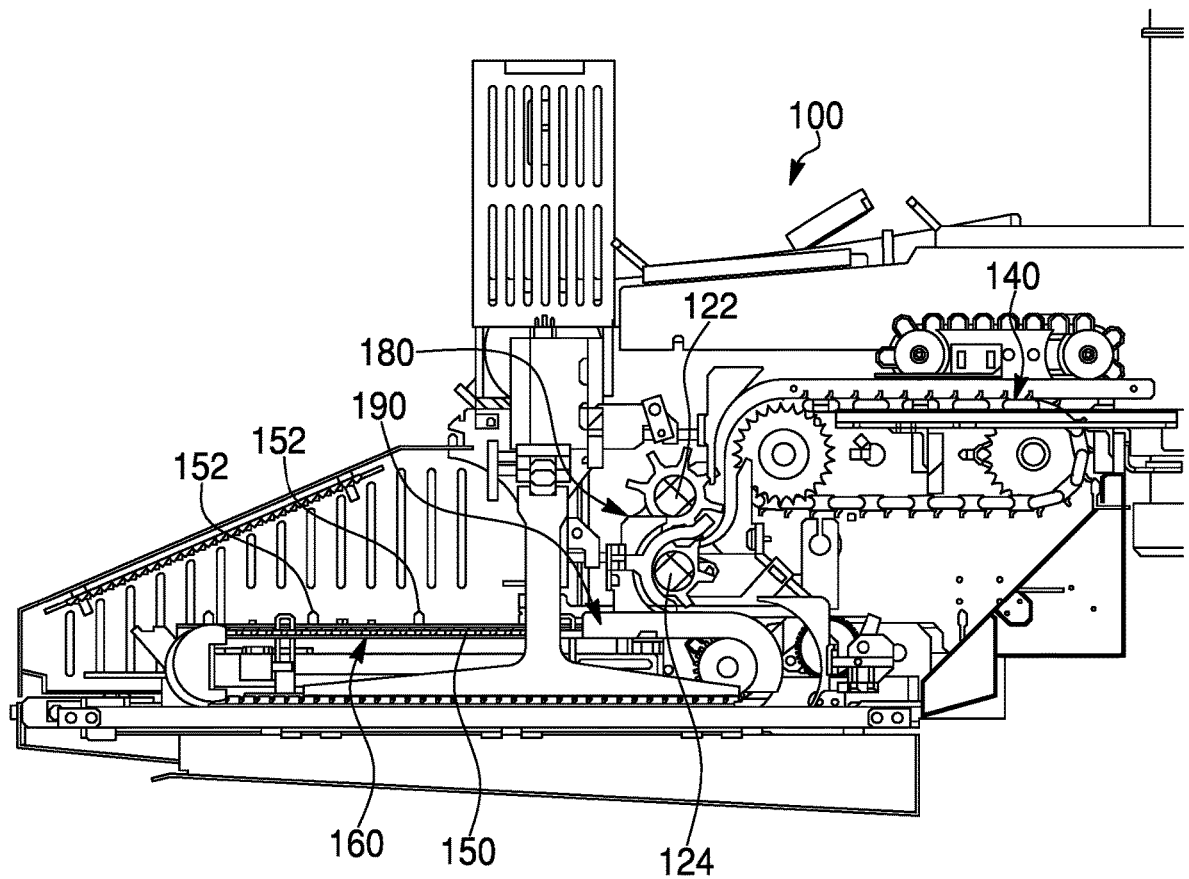
FIG. 1 is a side view of a loading head and linkage system of the prior art.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiment(s) is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims means "at least one".

Figure 2B:
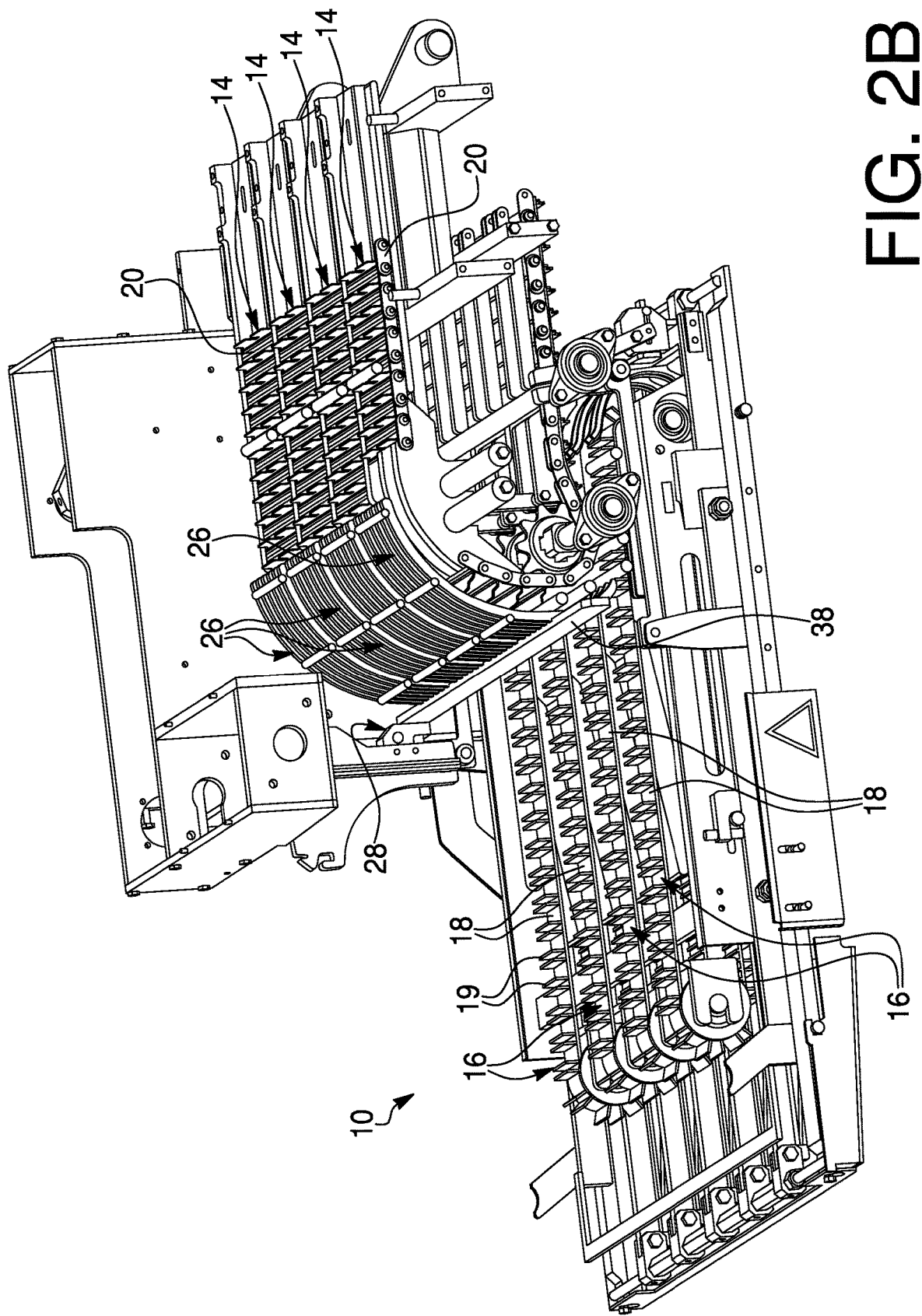
FIG. 2B is a partial perspective view of the loading apparatus for tubular food articles in accordance with the exemplary embodiment of the present invention.
Figure 2C:
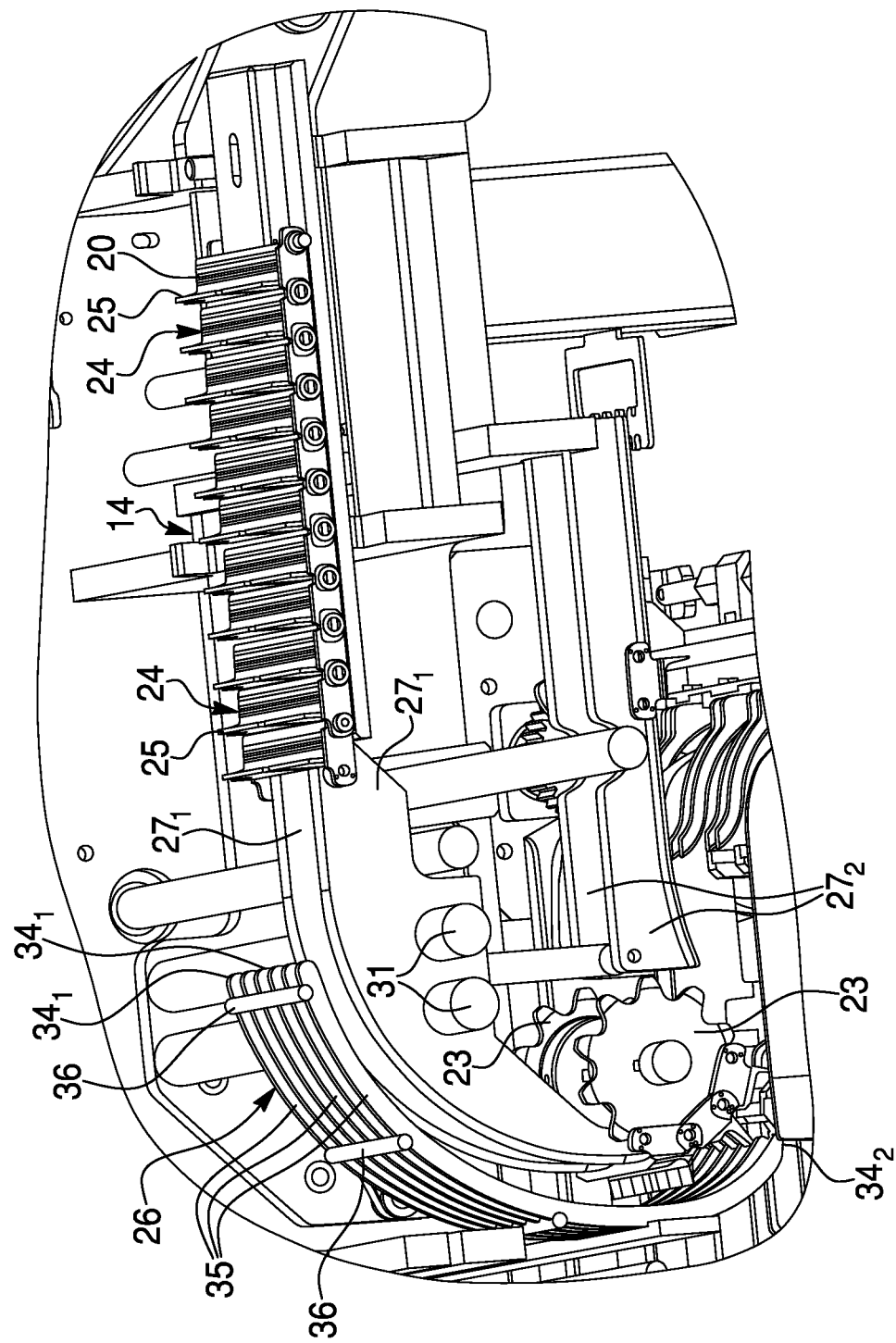
FIG. 2C is an enlarged perspective view of a portion of the loading apparatus in accordance with the exemplary embodiment of the present invention.

FIGS. 2A-2C illustrate a loading apparatus (or loading head, or direct transfer (DT) head) 10 according to an exemplary embodiment of the present invention used in transferring formed de-linked tubular food articles (or products) 12 from food manufacturing equipment (not shown) to a packaging machine (not shown). Specifically, the loading apparatus 10 is configured for handling the de-linked tubular food articles 12, such as sausages, frankfurters (or hotdogs), breadsticks and cheese sticks. The loading apparatus 10 comprises at least input conveyor 14 adapted to convey the tubular food articles 12 away from the food manufacturing equipment, at least indexing conveyor 16 positioned downstream of and beneath the input conveyor 14 for conveying the tubular food articles 12 from the input conveyor 14 to the packaging machine, and at least adjustable curved end member (or transfer arch) 26 extending between the input conveyor 14 and the indexing conveyor 16. According to the exemplary embodiment best shown in FIGS. 2A and 2B, the loading apparatus 10 comprises four input conveyors 14 disposed adjacent and parallel to each other, and four indexing conveyors 16 disposed adjacent and parallel to each other and positioned downstream of and beneath of one of the input conveyors 14. As best shown in FIGS. 2A and 2B, each of the curved end members 26 extends between one of the input conveyors 14 and the adjacent one of the indexing conveyors 16. The input conveyors 14, the indexing conveyors 16, and the curved end members 26 are substantially identical both structurally and functionally.

As best shown in FIGS. 2A-2C and 3, each of the input conveyors 14 includes a continuous input conveyor belt 20

(or bucket belt), preferably in the form of a chain belt. The input conveyor belt 20 rotatably extends around a sprocket 23 of the input conveyor 14, which is driven directly by a servo motor/reducer. Preferably, the input conveyor belt 20 is made of a plastic material that is easy to clean. Alternatively, the input conveyor belt 20 may be made of stainless steel or like material used in food handling. The input conveyor belt 20 has an input end $22_1$ at a first elevation and a curvilinear discharge end $22_2$ at a second elevation, such that the second elevation is below the first elevation. As best shown in FIGS. 2A, 2B and 3, each of the indexing conveyors 16 includes a continuous indexing conveyor belt 18, preferably in the form of a chain belt.

The input conveyor belts 20 of all of the input conveyors 14 are driven by the same shaft/servo motor driving the sprockets 23 thereof and move uniformly as one. The sprockets 23 of the input conveyors 14 are interconnected by a common drive shaft 44. Similarly, the indexing conveyor belts 18 of the indexing conveyors 16 are driven through a separate servo motor from the input conveyors 14 driving drive wheels (such as sprockets) 42 thereof. The drive wheels 42 of the indexing conveyors 16 are interconnected by a common drive shaft 43. The movement of the input conveyor belts 20 of all of the input conveyors 14 is coordinated with the movement of the indexing conveyor belts 18 of the indexing conveyors 16 through a PLC (Programmable Logic Controller) program that times them together so that for every input conveyor flight one tubular food article 12 is deposited in the indexing conveyor 16.

Each of the curved end members 26 is adjustably positioned in spaced arrangement to the sprocket 23, and is oriented and arranged to permit the input conveyor belt 20 to pass between the sprocket 23 and the curved end member 26. As a result of the spacing between member 26 and the belt 20 extending around sprocket 23, the curved end member 26 retains the tubular food articles 12 on the input conveyor belt 20. The curved end member 26 has a first end $34_1$ at the first elevation and a second end $34_2$ at the second elevation and configured so that the tubular food articles 12 are transported and retained by the input conveyor 14 while being transported to the discharge end $22_2$. The curved end member 26 comprises a plurality of spaced parallel curved plates 35 spaced relative to the input conveyor belt 20, as shown in FIGS. 2A-2C. Each of the curved plates 35 has the first end $34_1$ at the first elevation and the second end $34_2$ at the second elevation such that the second elevation is below the first elevation. The curved plates 35 are configured so that tubular food articles 12 are transported and retained by the input conveyor 14 while being transported to the discharge end $22_2$. The curved plates 35 are secured together by rods 36 fixed to the curved plates 35, such as by welding, and linearly movable relative to the input conveyor 14, as best shown in FIGS. 2C and 3.

The input conveyor 14 further includes a plurality of L-shaped scoops (or buckets) 24 pivotally mounted to the input conveyor belt 20 to receive and transport the tubular food articles 12 therein. Each of the scoops 24 has an integral flight 25 outwardly extending from the input conveyor belt 20 and separating consecutive (i.e., successive) scoops 24 with the result that the tubular food articles 12 are disposed from one another in the adjacent scoops 24. The pitch, height and width of the scoops 24 is optimized for the length and diameter of the tubular food articles 12 sorted by the loading apparatus 10. The scoops 24 are made of a plastic, stainless steel or other food handling materials. Alternatively, the scoops 24 may be of other shape and form capable of receiving and transporting the tubular food articles 12 therein. Further alternatively, the flights 25 may be mounted directly to the input conveyor belt 20 so as to outwardly extend therefrom to receive the tubular food articles 12 therebetween.

The scoops 24 with the flights 25 may be sized so there is a one-to-one flight per food article ratio; however, the scoops 24 may be sized or the flights 25 spaced to accommodate a plurality of the tubular food articles 12 or to accommodate tubular food articles 12 of varying size. The curved end member 26 is positioned in spaced relationship relative to the input conveyor belt 20 and the sprocket 23. The curved end member 26 is oriented and located to permit the conveyor belt 20 to pass between the sprocket 23 and the curved end member 26, such that the curved end member 26 prevents the tubular food articles 12 from being unintendedly removed from the input conveyor belt 20, i.e., retains the tubular food articles 12 on the input conveyor belt 20.

As best shown in FIG. 3, the tubular food articles 12 arrive at a transfer point, which coincides with the input end $22_1$ of the input conveyor belt 20 of the input conveyor 14. The input conveyor belt 20 is guided by two sets of plastic belt guides disposed under the input conveyor belt 20. According to the exemplary embodiment, the input conveyor belt 20 is guided by a first set of two horizontally spaced plastic belt guides $27_1$ before (or upstream of) the sprocket 23 and a second set of two horizontally spaced plastic belt guides $27_2$ after (or downstream of) the sprocket 23. The first set of the belt guides $27_1$ brings the input conveyor belt 20 down toward the sprocket 23 and the second set of the belt guides $27_2$ carries the input conveyor belt 20 back up to keep it from hitting the indexing conveyor belt 18. Also, the tight radius of the sprocket 23 helps release the tubular food articles 12 from the scoops 24. The first belt guides $27_1$ are resting on support shafts 31, best shown in FIG. 2C, that extend perpendicular to the belt direction. The belt guides $27_1$ are removable without tools. The second belt guides $27_2$, which are disposed after the sprockets 23, are bolted in place and therefore not easily removed. The input conveyor belt 20 is maintenance, removeable for repair or replacement.

Changing the elevation of the tubular food articles 12 is achieved by the curvature of the input conveyor belt 20 disposed adjacent the curved end member 26. As a consequence, the tubular food articles 12 are transferred directly from the input conveyor belt 20 to the indexing conveyor 16 by gravity as the input conveyor belt 20 with the tubular food articles 12 is moving toward the curved end member 26. While on the input conveyor belt 20, the tubular food articles 12 remain between the flights 25 and do not tumble or fall from the flights 25.

The curved end member 26 is positioned by adjustment device 28 controlling the position of the curved end member 26 relative to the input conveyor belt 20 by selectively and linearly (horizontally) moving the curved end member 26 toward and away the input conveyor belt 20, as best shown in FIG. 3. In the exemplary embodiment, the curved end member 26 is a lever operated adjustment device, which is manually moveable as a fine adjustment by the adjustment device 28 to keep the tubular food articles 12 contained as diameters of the tubular food articles 12 can vary from day to day. In the exemplary embodiment, the adjustment device 28 includes at least one, preferably two, guide rods 29 attached to a guide bar 38. The guide bar 38, in turn, is secured, such as by welding, to the curved end members 26, such as by welding, The guide rods 29 together with the guide bar 38 are moveable rectilinearly (horizontally) through at least one (preferably two) support block 33 toward and away the input conveyor belt 20 by a lever 30 (shown in FIG. 2A). Preferably, the support block 33 is made of plastic material. The lever 30 is configured to manually move the guide rod 29 with the curved end member 26 rectilinearly to keep the tubular food articles 12 contained between the input conveyor belt 20 and the curved end member 26 as diameters of the tubular food articles 12 can vary from day to day.

Depending on the diameter of the tubular food articles 12, a larger gap between the input conveyor belt 20 and the curved end member 26 at a top or a bottom may be provided. According to the exemplary embodiment, the gap does not stay uniform as you move the curved end member 26 in and out. Alternatively, the gap between the input conveyor belt 20 and the curved end member 26 may be uniform. Further alternatively, the adjustment device 28 may include a threaded adjusting rod attached to the curved end member 26 and moveable toward and away the input conveyor belt 20 by a linear actuator, such as a rotary electric motor, configured to move the adjusting rod 29 with the curved end member 26 rectilinearly.

The input conveyor 14 operates at a continuous speed while the indexing conveyor 16 operates with a relative intermittent motion. The indexing conveyor 16 rotates beneath the curved end member 26 to advance the tubular food articles 12 towards discharge end, and moves below the curved end member 26 so that the relative speed is maintained to allow food products to be discharged, as disclosed in U.S. Pat. No. 8,322,513, the disclosure of which is incorporated herein by reference.

The indexing conveyor belt 18, best shown in FIGS. 2A, 2B and 3, is positioned beneath the input conveyor belt 20 of the input conveyor 14, and is configured for conveying the tubular food articles 12 from the input conveyor 14 to the packaging machine. The indexing conveyor belt 18 has a series of lugs 19 equally spaced on the indexing conveyor belt 18. Spacing between the lugs 19 varies according to the required number of the tubular food articles 12 in a group and the diameter of the tubular food articles 12. The number of the tubular food articles 12 in a group may be one or more. According to the exemplary embodiment, the lugs 19 are spaced to accommodate a single tubular food article 12, as best shown in FIG. 3. In other words, spacings between the lugs 19 hold one of the tubular food articles 12 on the indexing conveyor belt 18. The input conveyor belt 20 rotates to deposit each of the tubular food articles 12 directly onto a top surface 32 of the indexing conveyor belt 18 by gravity.

As best shown in FIG. 3, the input conveyor belt 20 of the input conveyor 14 moves in the direction A (i.e., in a counterclockwise direction as seen in FIG. 3), while the indexing conveyor belt 18 of the indexing conveyor 16 moves in the direction B (i.e., in a clockwise direction as seen in FIG. 3). In other words, the tubular food articles 12 don't change directions when deposited from the input conveyor belt 20 on the indexing conveyor belt 18 but continue in the direction A of the input conveyor belt 20 once on the indexing conveyor belt 18.

The loading apparatus 10 is controlled through one or more control panels and one or more programmable logic controllers (PLCs). Controlling software ensures the timing of the flights 25 of the input conveyor 14 with the lugs 19 of the indexing conveyor 16 is synchronized. The tubular food articles 12 are released from a space between the flights 25 of the input conveyor belt 20 and the curved end member 26, and deposited onto the indexing conveyor belt 18 using gravity and aided with the centrifugal force created by a large arc of the curved end member 26 at a bottom end of the input conveyor belt 20 of the input conveyor 14.

Thus, the present invention eliminates the need for star wheels of the U.S. Pat. No. 8,453,822 by altering the path of the input conveyor 14 so that the flights 25 of the input conveyor 14 essentially take on the role of fingers on the star wheel of the U.S. Pat. No. 8,453,822. Accordingly, a certain number of flights 25 of the input conveyor 14, corresponding with the number of the tubular food articles 12 in a group, will line up with the lugs 19 of the indexing conveyor 16. Elimination of the star wheels allows for effortless packaging of single packaged tubular food articles.

Figure 4:
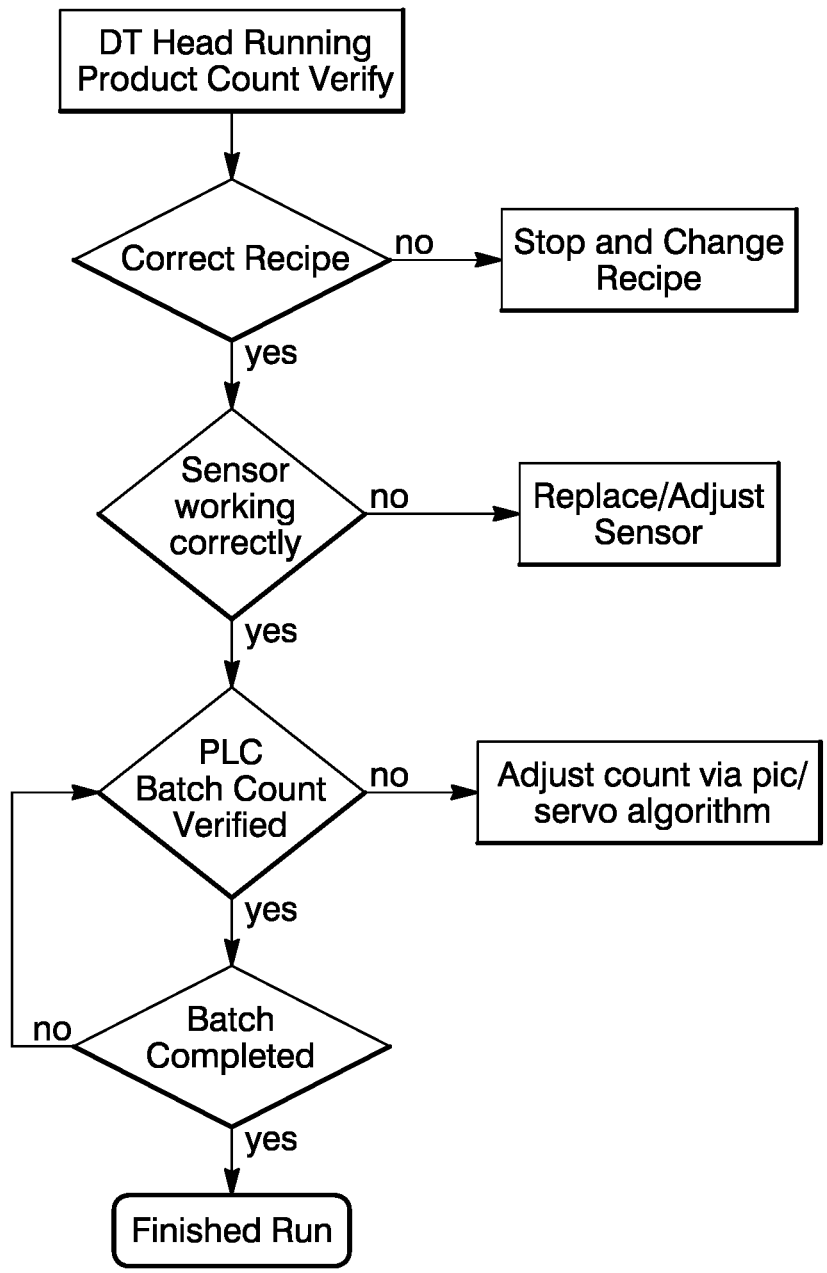
FIG. 4 is a flowchart showing overall product flow and decisions required for operation of the tubular food articles by the loading apparatus for loading groups of the tubular food articles in accordance with the exemplary embodiment of the present invention.

An overall product flow and summary of decisions required for controlling grouping of the tubular food articles 12 by the loading apparatus 10 is shown in FIG. 4. Specifically, when in operation, a product flow count (number of products in a package) is set by a food article recipe. The recipe is a collection of settings for running a particular product configuration. The recipe is selected by the operator from a HMI (Human Machine Interface) screen. A camera may verify count values and that motion of the input conveyor 14 continues normally if the camera detects sufficient count during processing by software in the PLC. If the count is determined to be insufficient, a servo controller is updated to adjust the speed of the input conveyor 14 to compensate for a missing food product count. Specifically, the speed of the input conveyor 14 is increased in order to add one more food product to the group. Alternatively, the input conveyor 14 and rack servomotor may be adjusted to add additional food articles 12. This adjustment process repeats during the flow of each group of the tubular food articles 12 through the loading apparatus 10 and food product count is adjusted automatically as needed.

Figure 5:
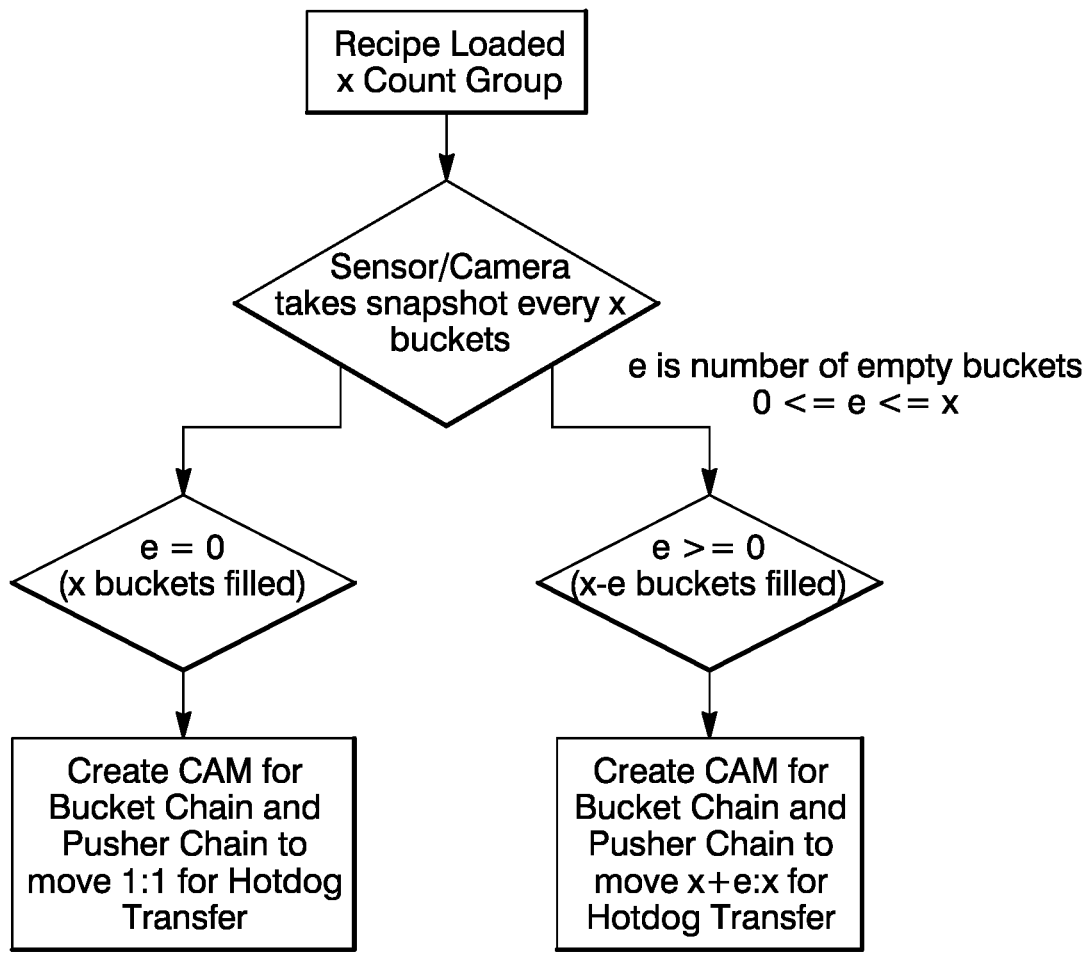
FIG. 5 shows an algorithm/process of the loading apparatus when loading the tubular food articles.

FIG. 5 illustrates an algorithm/process of controlling the loading apparatus 10 when loading the tubular food articles 12. The camera may take an image of the input conveyor 14 prior to entering the loading apparatus 10. Based upon the image, the PLC ascertains how many buckets are filled with the tubular food articles 12 and how many empty buckets are in the group ($0<e<=x$), and builds an appropriate CAM (i.e., a timing device to coordinate movement. A CAM in an automation software system precisely controls actions of other components in the software or associated hardware to fill a pusher chain group (i.e., a group of the tubular food articles 12, such as hotdogs) with the correct number the tubular food articles 12 by moving the correct number of the input conveyor 14. FIG. 5 describes CAM building for when there are no empty buckets or when some buckets are filled and others are empty.

Figure 6:
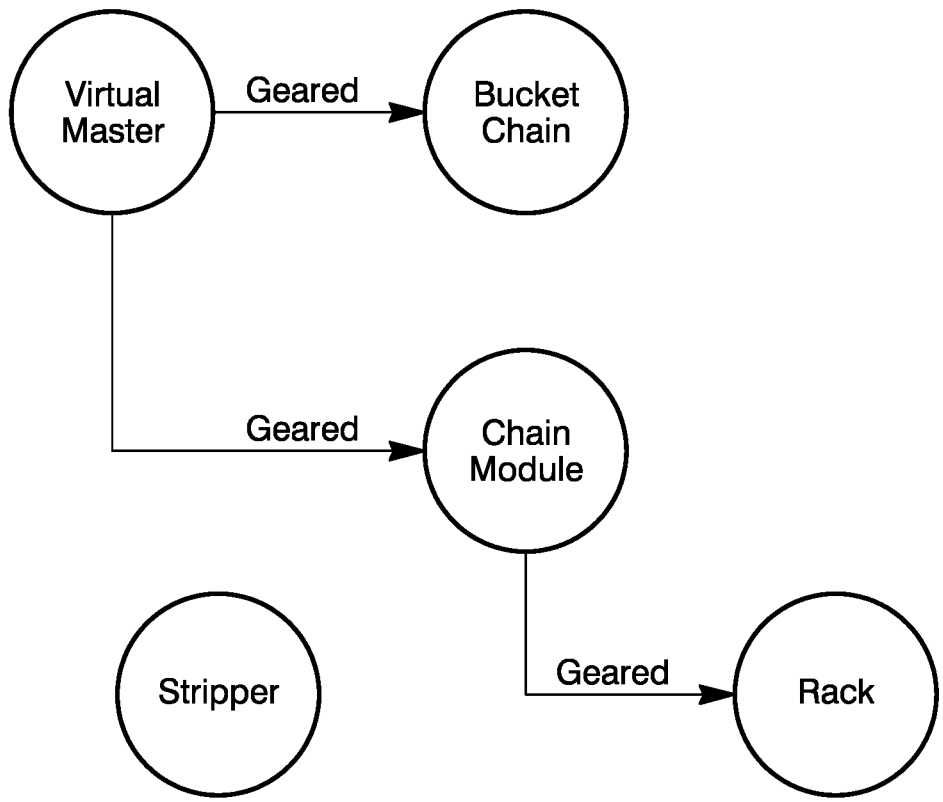
FIG. 6 shows relationship of servo functions to a virtual master.

FIG. 6 illustrates the relationship of servo functions to a virtual master, which dictates speed and position of the machine. The virtual master operates in terms of speed or position. The virtual master controls the grouping size for the tubular food articles 12. This shows the CAM relationship in the program. In turn, the PLC runs a servo motor, and generates CAMs based off the recipes. FIG. 6 illustrates the relationship of servo functions to a virtual master, which dictates speed and position of the machine (geared axes). The virtual master can operate in terms of speed or position. The virtual master controls the grouping size for the tubular food articles 12. This shows the CAM relationship in the program.

Thus, the loading apparatus 10 of the present invention is an improvement to an existing loading apparatus for the tubular food articles 12 disclosed in U.S. Pat. No. 8,453,822, as it allows for effortless packaging of single packaged tubular food articles.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A loading apparatus for tubular food articles, the loading apparatus comprising:
   a driven input conveyor configured to convey tubular food articles, the input conveyor having an input end at a first elevation and a curvilinear discharge end at a second elevation, the second elevation being below the first elevation;
   an indexing conveyor configured to operate in an intermittent motion, the indexing conveyor positioned below the input conveyor and operably associated with the discharge end; and
   a curved end member proximate the discharge end, the curved end member spaced relative to the input conveyor and having a first end at the first elevation and a second end at the second elevation and configured so that tubular food articles are transported and retained by the input conveyor while being transported to the discharge end;
   wherein the input conveyor is configured to transfer the tubular food articles about the input conveyor directly onto the indexing conveyor using gravity from a space between the discharge end and the indexing conveyor;
   wherein a plurality of input conveyors are disposed in a spaced, parallel array and a plurality of indexing conveyors are disposed in a spaced, parallel array; and
   wherein the input conveyors and the indexing conveyors are interconnected by drive shafts so that the movement of the input conveyors is coordinated with the movement of the indexing conveyors so that for every input conveyor flight one tubular food article is deposited in the indexing conveyor.

2. The loading apparatus of claim 1, wherein the indexing conveyor moves receiprocatingly beneath the input conveyor.

3. The loading apparatus of claim 1, wherein the curved end member is moveable toward and away the input conveyor.

4. The loading apparatus of claim 3, wherein the curved end member is linearly moveable toward and away the input conveyor.

5. The loading apparatus of claim 4, wherein a manual drive mechanism is operably associated with the curved end member for adjusting the spacing of the curved end member relative to the input conveyor.

6. The loading apparatus of claim 1, wherein a pair of laterally spaced curvilinear belt guides are operably associated with the input conveyor, the input conveyor travels around the belt guides at the discharge end.

7. The loading apparatus of claim 6, wherein the input conveyor belt is a chain belt.

8. The loading apparatus of claim 6, wherein each of the belt guides has an upper portion and a lower portion; and at least a first sprocket is mounted at the lower portion for receiving the input conveyor and advancing the input conveyor towards the input end.

9. The loading apparatus of claim 6, wherein the input conveyor includes a plurality of pivotal interconnected, spaced flights adapted for receiving tubular food products.

10. The loading apparatus of claim 9, wherein the indexing conveyor belt has a series of lugs equally spaced on a top surface of the indexing conveyor belt.

11. The loading apparatus of claim 1, wherein the curved end member is spaced from the input conveyor a first distance at the first end and a second distance at the second end, the first distance is identical to or different than the second distance.

12. The loading apparatus of claim 1, wherein the curved end member comprises a plurality of spaced parallel curvilinear plates.

13. A loading apparatus for tubular food articles, the loading apparatus comprising:
   a driven input conveyor configured to convey tubular food articles, the input conveyor having an input end at a first elevation and a discharge end at a second elevation, the second elevation being below the first elevation;
   an indexing conveyor configured to operate in an intermittent motion, the indexing conveyor positioned below the input conveyor and operably associated with the discharge end; and
   a curved end member proximate the discharge end, the curved end member comprising a plurality of spaced parallel plates spaced relative to the input conveyor, each of the plates having a first end at the first elevation and a second end at the second elevation, the plates configured so that the tubular food articles being transported and retained by the input conveyor while being transported to the discharge end;
   wherein the input conveyor is configured to transfer the tubular food articles about the input conveyor directly onto the indexing conveyor using gravity from a space between the discharge end and the indexing conveyor;
   wherein a plurality of input conveyors are disposed in a spaced, parallel array and a plurality of indexing conveyors are disposed in a spaced parallel array; and
   wherein the input conveyors and the indexing conveyors are interconnected by drive shafts so that the movement of the input conveyors is coordinated with the movement of the indexing conveyors so that for every input conveyor flight one tubular food article is deposited in the indexing conveyor.

14. The loading apparatus of claim 13, wherein the curved end is spaced a first distance from the input conveyor at the first end and a second distance at the second end, the first distance is identical to or different than the second distance.

15. The loading apparatus of claim 13, wherein the plates are secured together and linearly movable relative to the input conveyor.

16. The loading apparatus of claim 15, wherein a manually adjustable drive linearly moves the plates.

17. The loading apparatus of claim 13, further including at least a first driven sprocket engaged with the input conveyor at the discharge end.

18. A method of loading tubular food articles, the method comprising the steps of:
- conveying a plurality of tubular food articles with an input conveyor, the input conveyor having an input end at a first elevation and a discharge end at a second elevation, the first elevation being above the second elevation;
- positioning an indexing conveyor below the input conveyor and operating the indexing conveyor at speeds above and below a speed that is synchronous with a speed of the input conveyor, wherein operation of the indexing conveyor causes the indexing conveyor to travel in an intermittent motion; and
- adjusting the position of a curved end member relative to the input conveyor so that tubular food articles carried by the input conveyor are transferred from the input conveyor directly to the indexing conveyor using gravity from a space between the input conveyor and the curved end member;
- wherein a plurality of input conveyors are disposed in a spaced, parallel array and a plurality of indexing conveyors are disposed in a spaced parallel array; and
- wherein the input conveyors and the indexing conveyors are interconnected by drive shafts so that the movement of the input conveyors is coordinated with the movement of the indexing conveyors so that for every input conveyor flight one tubular food article is deposited in the indexing conveyor.

19. The method of claim 18, including the step of adjusting the position of the curved end member by moving the curved end member toward or away the input conveyor.

20. The method of claim 19, including the step of moving the curved end member linearly.

* * * * *